(12) United States Patent
Stockton et al.

(10) Patent No.: US 11,204,192 B2
(45) Date of Patent: Dec. 21, 2021

(54) ADJUSTABLE DUCT FOR HVAC SYSTEM

(71) Applicant: Johnson Controls Technology Company, Auburn Hills, MI (US)

(72) Inventors: Kevin R. Stockton, York, PA (US); Nicholas P. Mislak, Bel Air, MD (US)

(73) Assignee: Johnson Controls Technology Company, Auburn Hills, MI (US)

( * ) Notice: Subject to any disclaimer, the term of this patent is extended or adjusted under 35 U.S.C. 154(b) by 135 days.

(21) Appl. No.: 16/034,259

(22) Filed: Jul. 12, 2018

(65) Prior Publication Data

US 2019/0383536 A1  Dec. 19, 2019

Related U.S. Application Data

(60) Provisional application No. 62/685,412, filed on Jun. 15, 2018.

(51) Int. Cl.
*F25B 5/02* (2006.01)
*F25B 49/02* (2006.01)
*F25B 39/02* (2006.01)

(52) U.S. Cl.
CPC .............. *F25B 49/02* (2013.01); *F25B 5/02* (2013.01); *F25B 39/028* (2013.01); *F25B 2600/112* (2013.01); *F25B 2600/21* (2013.01); *F25B 2700/197* (2013.01); *F25B 2700/21175* (2013.01)

(58) Field of Classification Search
CPC .............. F24F 11/77; F24F 11/81; F24F 1/00
See application file for complete search history.

(56) References Cited

U.S. PATENT DOCUMENTS

| | | | |
|---|---|---|---|
| 7,137,775 B2 | 11/2006 | Hopkins | |
| 7,179,046 B2 | 2/2007 | Hopkins | |
| 7,527,468 B2 | 5/2009 | Hopkins | |
| 7,597,534 B2 | 10/2009 | Hopkins | |
| 7,914,252 B2 | 3/2011 | Hopkins | |
| 7,922,442 B2 | 4/2011 | Hopkins | |
| 8,087,877 B2 | 1/2012 | Hopkins | |
| 8,166,776 B2 * | 5/2012 | Kopko | F28F 27/02 62/513 |
| 8,419,348 B2 | 4/2013 | Hopkins | |

(Continued)

FOREIGN PATENT DOCUMENTS

WO 2004085928 A2 10/2004

*Primary Examiner* — Filip Zec
(74) *Attorney, Agent, or Firm* — Fletcher Yoder, P.C.

(57) ABSTRACT

The present disclosure relates to an adjustable fluid flow system for a temperature control system having a heat exchanger including a plurality of channels configured to transmit working fluid and direct the working fluid through a selection of two or more channel sections. The adjustable fluid flow system includes a first chamber defining a first flow path that is aligned with a first channel section of the two or more channel sections, wherein the first chamber includes a first outlet in fluid communication with the first flow path, and a second chamber defining a second flow path that is aligned with a second channel section of the two or more channel sections, wherein the second chamber includes a second outlet in fluid communication with the second flow path. The adjustable fluid flow system further includes a damper configured to adjust a flow of air along the first flow path.

24 Claims, 10 Drawing Sheets

(56) References Cited

U.S. PATENT DOCUMENTS

| | | |
|---|---|---|
| 8,651,391 B2 | 2/2014 | Patch |
| 8,814,639 B1 | 8/2014 | Mecozzi |
| 8,849,463 B2 | 9/2014 | Hopkins et al. |
| 9,328,956 B2 * | 5/2016 | Abbasi ................... F25D 29/00 |
| 2002/0062948 A1 * | 5/2002 | Horttanainen ............ F24F 1/01 |
| | | 165/123 |
| 2002/0088238 A1 * | 7/2002 | Holmes ................. F25D 21/006 |
| | | 62/155 |
| 2003/0029178 A1 * | 2/2003 | Zentner .................. F25D 29/00 |
| | | 62/186 |
| 2003/0042012 A1 * | 3/2003 | Pearson ............... F24F 11/0001 |
| | | 165/210 |
| 2006/0137371 A1 * | 6/2006 | Knight .................... F24F 3/153 |
| | | 62/196.4 |
| 2006/0211365 A1 * | 9/2006 | Petrovic ................ F24F 13/078 |
| | | 454/261 |
| 2007/0081888 A1 | 4/2007 | Harrison |
| 2010/0029195 A1 | 2/2010 | Jalali et al. |
| 2010/0140363 A1 * | 6/2010 | Hirsch ................. G05D 7/0635 |
| | | 236/12.1 |
| 2010/0263829 A1 * | 10/2010 | Kimura ................. F24F 13/078 |
| | | 165/59 |
| 2011/0014061 A1 | 1/2011 | Hopkins et al. |
| 2011/0189939 A1 * | 8/2011 | Fey ........................... F24F 1/01 |
| | | 454/339 |
| 2012/0015600 A1 * | 1/2012 | Larsson .................. F24F 13/26 |
| | | 454/254 |
| 2012/0031599 A1 * | 2/2012 | Obuchi ................. F24F 12/006 |
| | | 165/172 |
| 2012/0118535 A1 * | 5/2012 | Williams ............... F24F 1/0007 |
| | | 165/104.14 |
| 2013/0025310 A1 * | 1/2013 | Itoh .................... B60H 1/00064 |
| | | 62/186 |

\* cited by examiner

ADJUSTABLE DUCT FOR HVAC SYSTEM

CROSS REFERENCE TO RELATED APPLICATIONS

This application claims priority from and the benefit of U.S. Provisional Application Ser. No. 62/685,412, entitled "ADJUSTABLE DUCT FOR HVAC SYSTEM," filed Jun. 15, 2018, which is hereby incorporated by reference in its entirety for all purposes.

BACKGROUND

This disclosure relates generally to heating, ventilation, and air conditioning (HVAC) systems and units. Specifically, the present disclosure relates to an adjustable fan duct for HVAC units.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

A heating, ventilation, and air conditioning (HVAC) system may be used to thermally regulate an environment, such as a building, home, or other structure. The HVAC system generally includes a vapor compression system, which includes heat exchangers such as a condenser and an evaporator, which transfer thermal energy between the HVAC system and the environment. In many cases, a fluid to be conditioned, such as air, may flow across the evaporator and, thus, enable a heat transfer fluid within the evaporator, such as a refrigerant, to absorb thermal energy from the fluid to be conditioned. A compressor of the vapor compression system may direct the refrigerant to a condenser, which removes the absorbed thermal energy from the refrigerant. For example, ambient air from the atmosphere may be drawn across a heat exchange area of the condenser, such that the refrigerant may transfer thermal energy to the ambient air. Accordingly, a flow of ambient air may be used to cool the refrigerant. Unfortunately, in some cases, the fluid to be conditioned may be directed across sections of the evaporator ineffectively, which may decrease an efficiency of the HVAC system.

SUMMARY

The present disclosure relates to an adjustable fluid flow system for a temperature control system having a heat exchanger including a plurality of channels configured to transmit working fluid and direct the working fluid through a selection of two or more channel sections. The adjustable fluid flow system includes a first chamber defining a first flow path that is aligned with a first channel section of the two or more channel sections, wherein the first chamber includes a first outlet in fluid communication with the first flow path, and a second chamber defining a second flow path that is aligned with a second channel section of the two or more channel sections, wherein the second chamber includes a second outlet in fluid communication with the second flow path. The adjustable fluid flow system further includes a damper configured to adjust a flow of air along the first flow path.

The present disclosure also relates to a temperature control system including a heat exchanger, wherein the heat exchanger is divided into at least two sections, a respective chamber positioned adjacent to each section of the at least two sections, wherein each respective chamber comprises at least one outlet, a fan communicatively coupled to the at least one outlet, and a respective damper associated with each outlet, and a controller, wherein the controller is configured to modulate a position of each respective damper based at least in part on an operational status of the at least two sections.

The present disclosure also relates to a fluid flow and temperature control system having a vapor compression system, an evaporator in fluid communication with the vapor compression system, wherein the evaporator includes a first section and a second section and is configured to control working fluid flow through one or both of the first and second sections, wherein the evaporator is disposed adjacent to or within an adjustable fan duct. The adjustable fan duct includes a first chamber associated with the first section of the evaporator relative to a first airflow path, wherein the first chamber comprises at least one first outlet, a first damper associated with the at least one first outlet, and a first fan, and a second chamber associated with the second section of the evaporator relative to a second airflow path, wherein the second chamber comprises at least one second outlet, a second damper associated with the at least one second outlet, and a second fan, and a controller configured to actuate one or both of the first damper and the second damper based on an operational status of the evaporator.

BRIEF DESCRIPTION OF THE DRAWINGS

Various aspects of this disclosure may be better understood upon reading the following detailed description and upon reference to the drawings in which.

DETAILED DESCRIPTION

Figure 1:
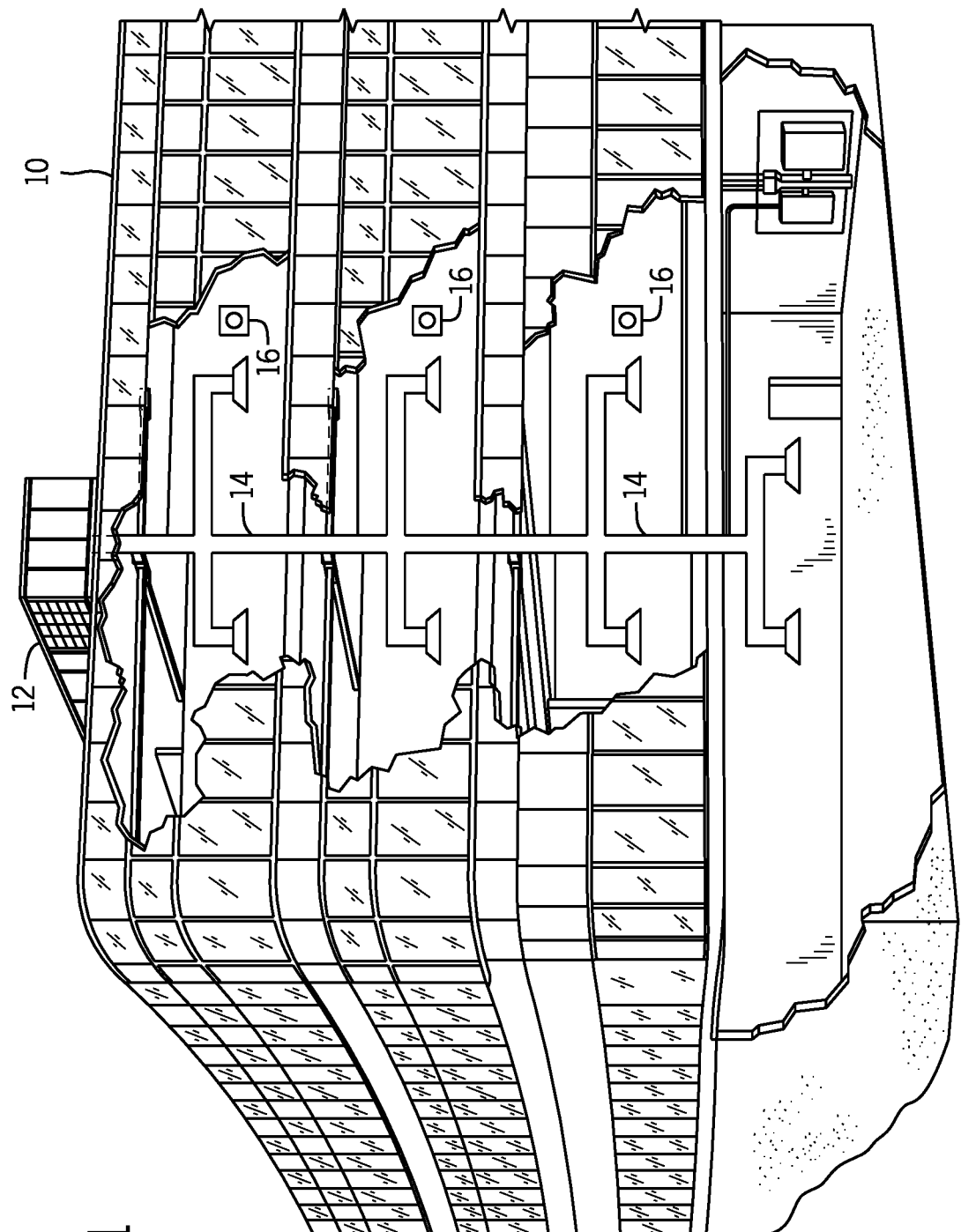
FIG. 1 is a perspective view of a heating, ventilation, and air conditioning (HVAC) system for building environmental management, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A heating, ventilation, and air conditioning (HVAC) system may be used to thermally regulate a space within a building, home, or other suitable structure. In many cases, the HVAC system includes a vapor compression system that transfers thermal energy between a heat transfer fluid, such as a refrigerant, and a fluid to be conditioned, such as air. The vapor compression system may include a condenser and an evaporator that are fluidly coupled to one another via a conduit. A compressor may be used to circulate the refrigerant through the conduit and, thus, enable the transfer of thermal energy between the condenser and the evaporator.

For example, the HVAC system may direct a flow of air to be conditioned across a heat exchange area of the evaporator, such that refrigerant within the evaporator may absorb thermal energy from the flow of air through walls, such as channel walls, of the evaporator. Accordingly, the evaporator may discharge a cooled flow of air, which may be directed toward a cooling load, such as one or more rooms of the building or other suitable structure. In some cases, the refrigerant within the evaporator may absorb sufficient thermal energy to boil, such that the refrigerant exits the evaporator in a hot, gaseous phase. The compressor circulates the gaseous refrigerant toward the condenser, which may be used to remove the absorbed thermal energy from the refrigerant. For example, ambient air from the atmosphere is drawn through or across a heat exchange area of the condenser, such that the gaseous refrigerant transfers thermal energy to the ambient air. In many cases, the condenser may enable the refrigerant to change phase, or condense, from the gaseous phase to the liquid phase, and the liquid refrigerant may then be redirected toward the evaporator for reuse.

In certain cases, the evaporator may be disposed with a duct of the HVAC system. The duct may include a plurality of evaporator fans or other flow generators, which direct air across a section, or sections, of the evaporator, such as an evaporator coil or multiple evaporator coils. For example, the evaporator may be disposed near an upstream end portion of the duct, while the evaporator fans may be disposed near a downstream end portion of the duct. As such, the evaporator fans may draw the air through the duct and across the evaporator coil or coils. In some cases, a portion, or a first section, of the evaporator may be temporarily disabled or in a non-operational state when a cooling demand of the HVAC system decreases below a threshold value. For example, the portion or first section of the evaporator may have refrigerant supplied thereto via a dedicated compressor that is deactivated, or the evaporator coil may have valves configured to block refrigerant or working fluid flow through the portion or first section when a cooling demand of the HVAC system decreases below the threshold value. In such cases, refrigerant or working fluid may flow through a remaining portion, or a second section, of the evaporator. In other words, the evaporator may be split into an inactive or non-operational section, such as the first section, and an active or operational section, such as the second section. Unfortunately, existing evaporator fan arrays may draw ambient air across both the operational and non-operational sections of the evaporator, which may increase an energy consumption of the evaporator fan array and, thus, decrease an efficiency of the HVAC system.

Embodiments of the present disclosure are directed to an adjustable fan duct that may be used to modulate a flow of supply air across certain sections or subsets of channels of the evaporator. For example, the adjustable fan duct may substantially block a flow of supply air across inactive or non-operational sections of the evaporator, and facilitate flowing the supply air across active or operational sections of the evaporator. In some embodiments, the adjustable fan duct may include a plurality of internal chambers, in which each chamber of the plurality of internal chambers is associated with a particular section of the evaporator. One or more fans may facilitate directing supply air through each of the chambers. For example, a first fan may direct supply air through a first chamber and, thus, across a first section of the evaporator. Similarly, a second fan may direct air through a second chamber and, thus, across a second section of the evaporator. In some cases, fans corresponding to a chamber that is associated with an inactive section of the evaporator may be turned off, or disabled, such that these fans draw substantially no air across the inactive section of the evaporator. As such, the fans may be used to selectively enable or disable, the flow of ambient air across certain sections of the evaporator. The adjustable fan duct may include actuated dampers, which may block a backdraft of air from flowing through the disabled fans. Accordingly, the adjustable fan duct may modulate the flow of supply air across certain sections of the evaporator, which may enhance an efficiency of the HVAC system.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
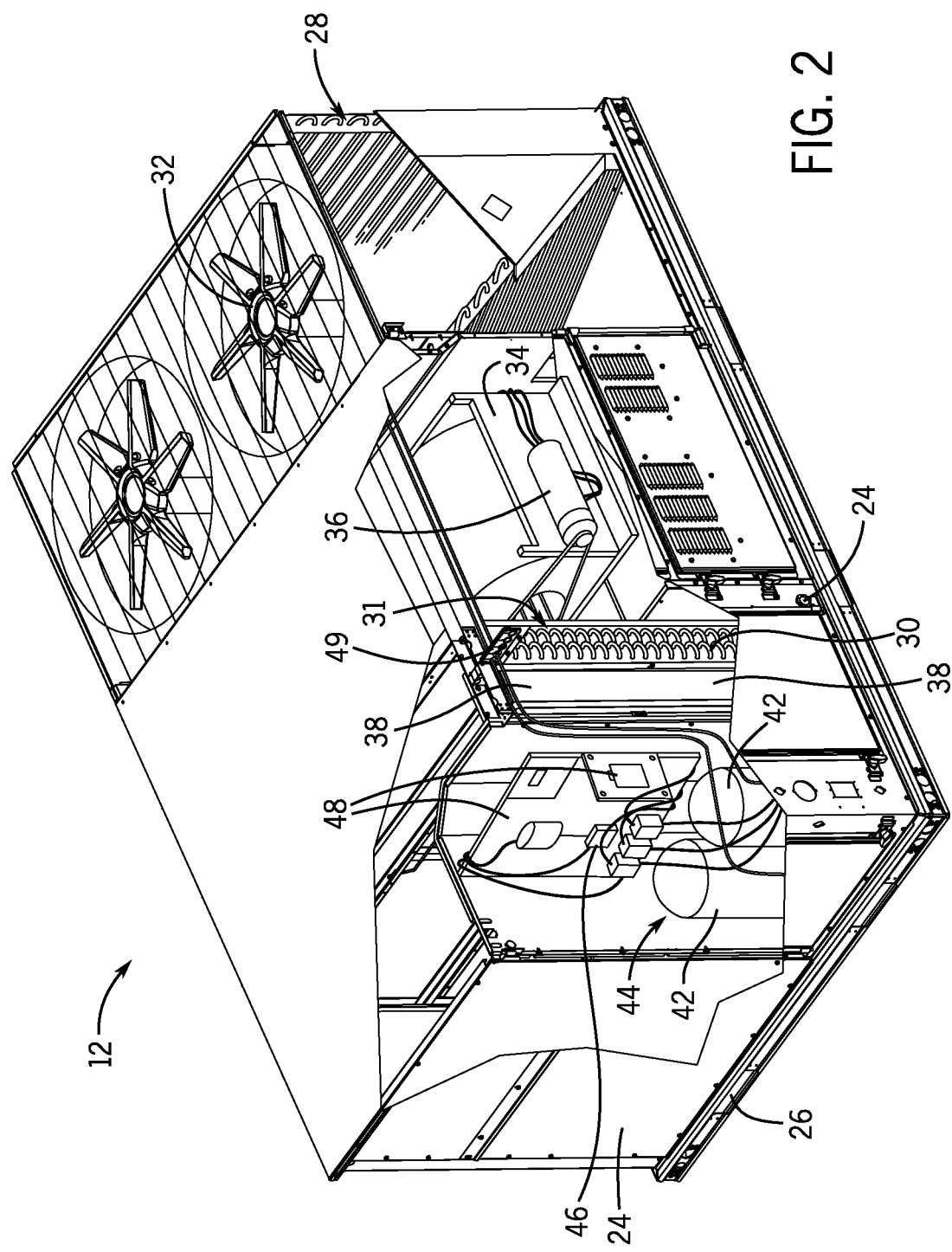
FIG. 2 is a perspective view of a packaged HVAC unit of the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant through the heat exchangers 28 and 30. For example, the refrigerant may be R-410A. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
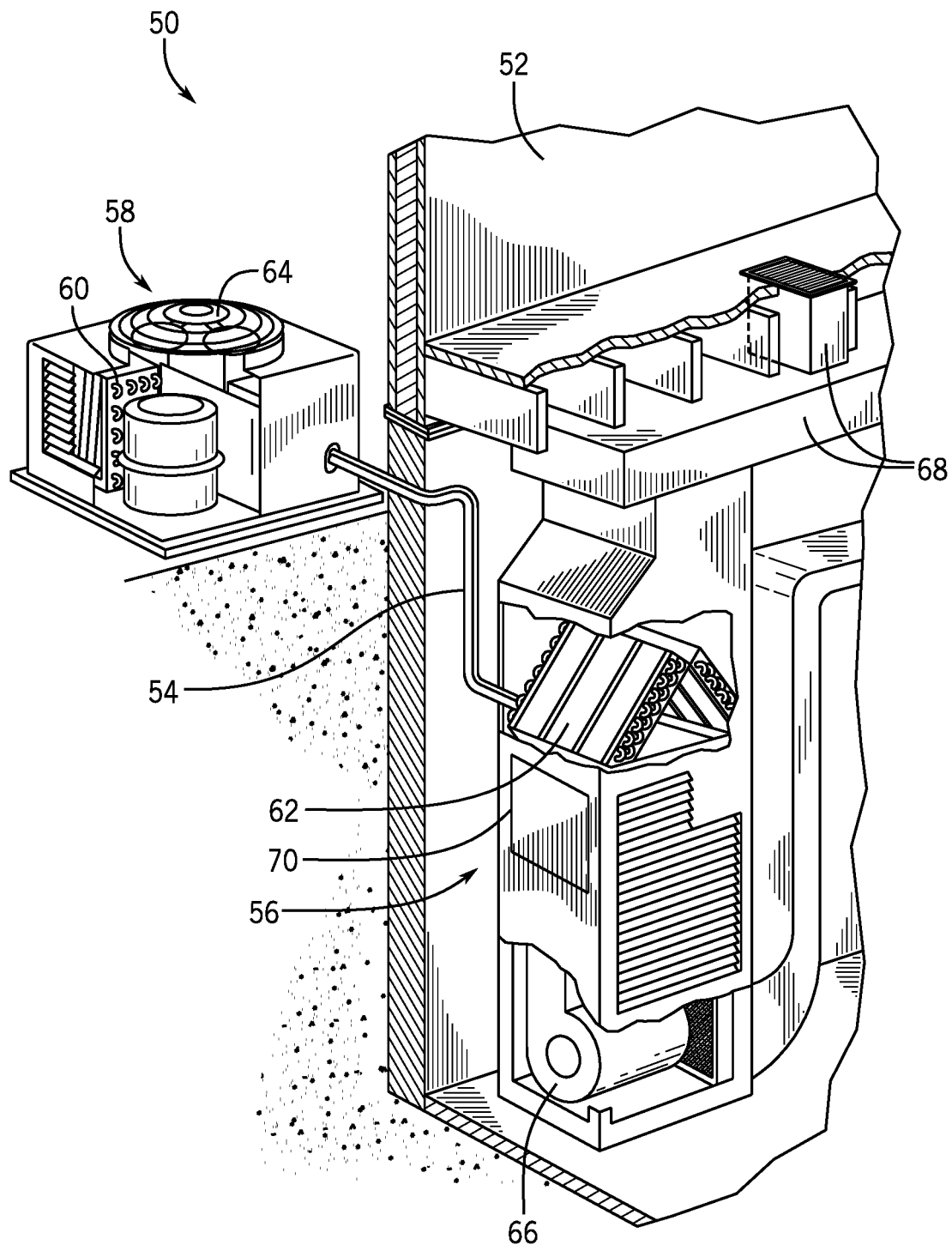
FIG. 3 is a perspective view of a residential HVAC system, in accordance with an aspect of the present disclosure.

FIG. 3 illustrates a residential heating and cooling system, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
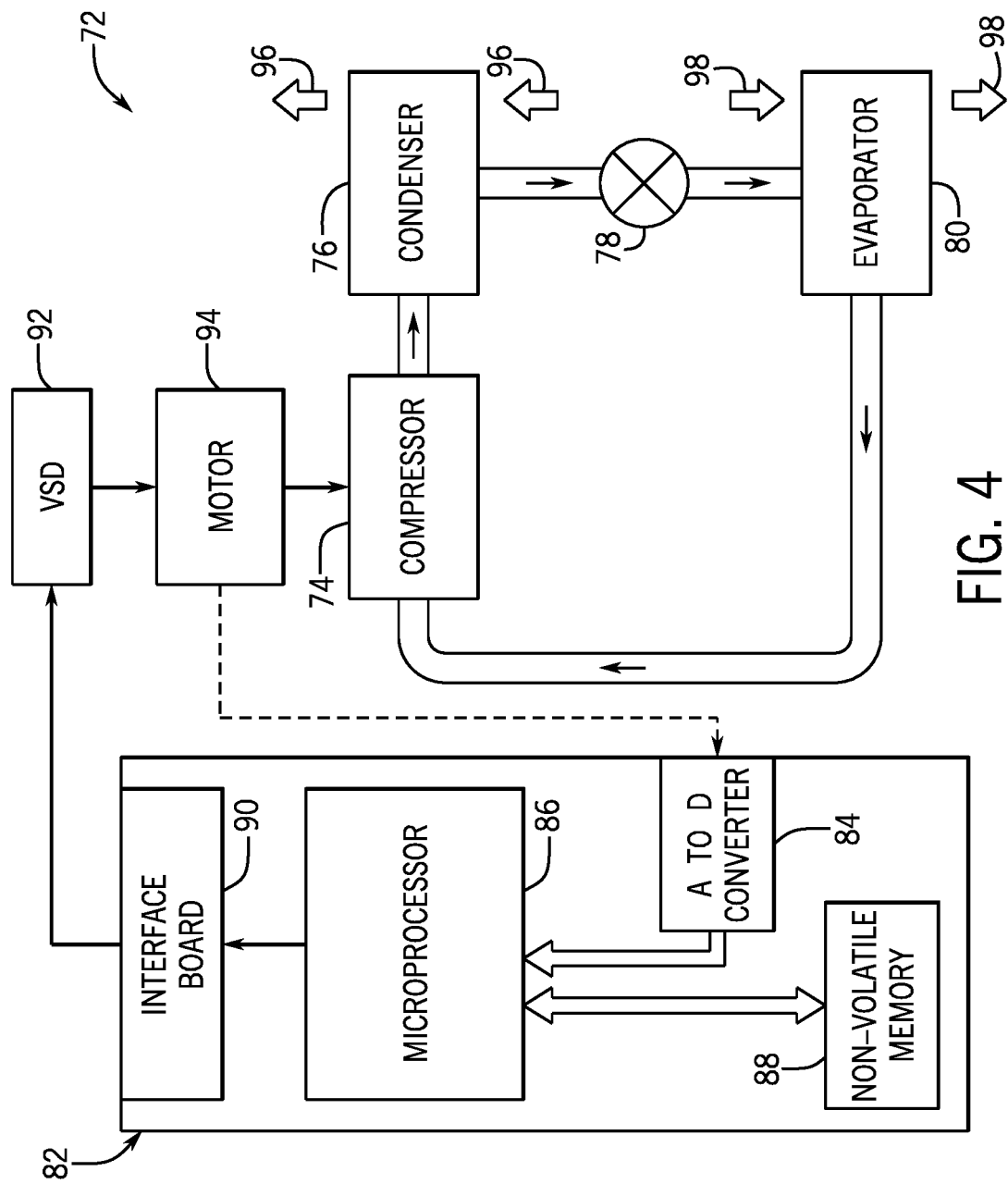
FIG. 4 is a schematic diagram of an embodiment of a vapor compression system that may be used in the packaged HVAC system of FIG. 2 and/or the residential HVAC system FIG. 3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or any other suitable HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As discussed above, embodiments of the present disclosure are directed to an adjustable fan duct that may be used to modulate a flow of air or other separate fluid across the evaporator 80. For example, the adjustable fan duct may be a component of the HVAC unit 12 of FIG. 2 or the indoor unit 56 of FIG. 3. In some embodiments, certain portions or sections of the evaporator 80 may be non-operational when a cooling demand of an HVAC system is decreased below a threshold value. Accordingly, the vapor compression system 72 may direct substantially no refrigerant through the non-operational, or inactive sections of the evaporator 80. The adjustable fan duct may be used to block airflow across the inactive or non-operational sections of the evaporator 80 by, for example, deactivating evaporator fans associated with the non-operational sections. As described in greater detail herein, the adjustable fan duct may further include one or more dampers or other mechanism associated with each evaporator fan, which may mitigate a backdraft of air flowing through evaporator fans that are disabled. Accordingly, the adjustable fan duct may reduce a power consumption of the HVAC system and, thus, increase an energy efficiency of the HVAC system.

Figure 5:
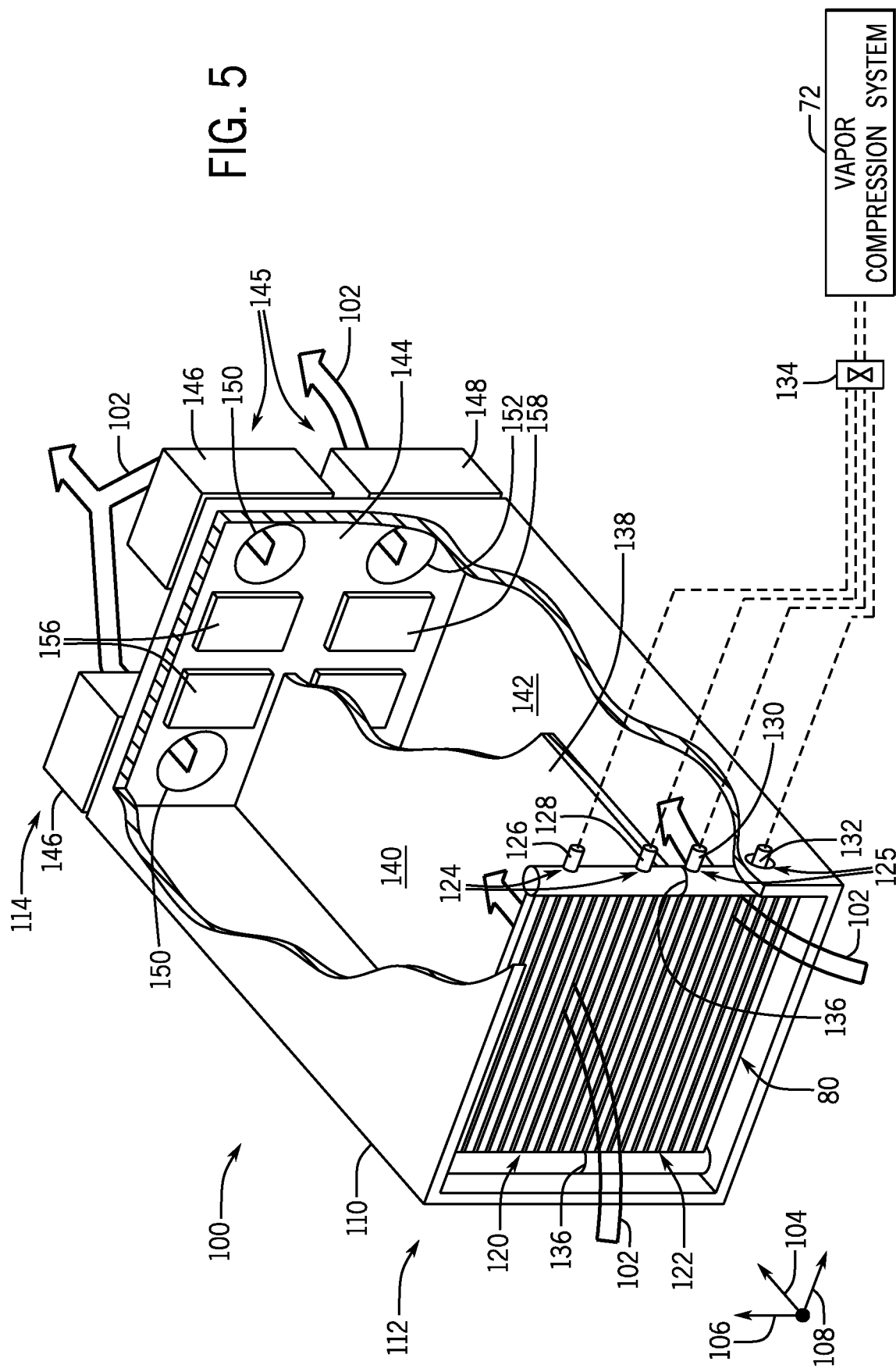
FIG. 5 is a perspective view of an embodiment of an adjustable fan duct that may be used in an HVAC system or unit, in accordance with an aspect of the present disclosure.

With the foregoing in mind, FIG. 5 is a perspective view of an embodiment of an adjustable fan duct 100, which may be used to modulate a flow of supply air 102 across the evaporator 80. To facilitate discussion, the adjustable fan duct 100 and its components may be described with reference to a longitudinal axis or direction 104, a vertical axis or direction 106, and a lateral axis or direction 108. In some embodiments, the adjustable fan duct 100 may include an outer housing 110, which extends from an upstream end portion 112 of the adjustable fan duct 100 to a downstream end portion 114 of the adjustable fan duct 100. It should be noted that a portion of the outer housing 110 has been removed in the illustrative embodiment, to show components that may be disposed within an interior of the outer housing 110, such as the evaporator 80, which may be disposed near the upstream end portion 112 of the adjustable fan duct 100.

The evaporator 80 includes a plurality of channels or tubes through which a working fluid, such as refrigerant, may flow. The plurality of channels may be divided into subsets to define individual sections or coils of the evaporator 80. For example, as discussed above, the evaporator 80 may include individual sections, or coils, to which a flow of refrigerant may be selectively enabled or disabled. Accordingly, a size of the heat exchange area of the evaporator 80 may be adjusted. For example, the evaporator 80 may include an upper section 120 or subset of channels and a lower section 122 or subset of channels, which are fluidly coupled to the vapor compression system 72 through upper connection ports 124 and lower connection ports 125, respectively. The upper and lower sections 120, 122 of the evaporator 80 may each include an evaporator coil and, thus, form a first refrigerant loop and a second refrigerant loop, respectively, which are fluidly independent of one another. Each independent refrigerant loop may include its own corresponding condenser 76 and compressor 42. However, in other embodiments, each refrigerant loop may be fluidly coupled to a common condenser 76 and/or a common compressor 42.

In any case, a first flow of refrigerant from the vapor compression system 72 may enter the upper section 120 of the evaporator 80 via an upper inlet 126. The first flow of refrigerant may pass through the upper section 120 and subsequently discharge through upper outlet 128, such that the first flow of refrigerant may be redirected toward the vapor compression system 72. Similarly, a second flow of refrigerant may pass through the lower section 122 of the evaporator 80 by flowing into a lower inlet 130 and discharging through a lower outlet 132. The vapor compression system 72 may include a valve 134, or a plurality of valves, which may modulate a flowrate of the first flow of refrigerant and the second flow of refrigerant. For example, the valve 134 may block the first flow of refrigerant from entering the upper section 120, while enabling the second flow of refrigerant to pass through the lower section 122, or vice versa. It should be noted that although the evaporator 80 includes two sections in the illustrative embodiment, the evaporator 80 may alternatively include any suitable number of sections. For example, the evaporator 80 may include 1, 2, 3, 4, 5, 6, or more individual sections, which are each in fluid communication with the vapor compression system 72. In certain embodiments, each section of the evaporator 80 may be a component of its own refrigerant loop.

In some embodiments, the upper section 120 and the lower section 122 may be separate sections of a single evaporator, such as the evaporator 80. For example, the evaporator 80 may include one or more dividers 136, which may split the evaporator 80 into individual sections, such as the upper and lower sections 120, 122. However, in other embodiments, the upper section 120 and the lower section 122 may each include an individual evaporator or plurality of channels for refrigerant flow. In other words, the upper section 120 may include a first evaporator, while the lower section includes a second evaporator, which may be removably coupled to the first evaporator.

The adjustable fan duct 100 may include a separation plate 138 that is oriented substantially perpendicular the evaporator 80 and extends along the longitudinal direction 104 from the upstream end portion 112 to the downstream end portion 114 of the adjustable fan duct 100. As described in greater detail herein, the separation plate 138 may divide the outer housing 110 into an upper chamber 140 and a lower chamber 142, which may be associated with the upper section 120 and the lower section 122 of the evaporator 80, respectively. It should be noted that a portion of the separation plate 138 has been removed in the illustrative embodiment to show components that may be disposed below the separation plate 138 and/or within the lower chamber 142 of the adjustable fan duct 100.

The separation plate 138 may couple to an end plate 144 of the outer housing 110, which may be disposed near the downstream end portion 114 of the adjustable fan duct 100. The end plate 144 may include or support one or more fans 145, or an array of fans, that are configured to draw the supply air 102 through the adjustable fan duct 100 and across the evaporator 80. Specifically, the end plate 144 may include one or more upper fans or flow generators 146 and one or more lower fans or flow generators 148, which may be configured to draw the supply air 102 through the upper and lower chambers 140, 142 of the outer housing 110, respectively. The upper and lower fans 146, 148 may be fluidly coupled to the upper and lower chambers 140, 142 through upper discharge openings 150 and lower discharge openings 152, respectively. Accordingly, the one or more fans 145 may direct the supply air 102 across the evaporator 80, through the adjustable fan duct 100, and discharge the supply air 102 through the upper and lower discharge openings 150, 152.

As described in greater detail herein, the adjustable fan duct 100 may include upper dampers 156 and lower dampers 158, which may be associated with each of the upper and lower discharge openings 150, 152, respectively. The upper dampers and lower dampers 156, 158 may be any suitable mechanism for blocking the upper and lower discharge openings 150, 152. For example, the upper dampers and lower dampers 156, 158 may be backdraft dampers, face dampers, bypass dampers, louvers, plates, panels, hinged doors, or any other suitable feature.

In some embodiments, the upper and lower dampers 156, 158 may be configured to slide along the lateral direction 108, generally parallel to the end plate 144, and enable, or substantially disable, flowing the supply air 102 through the upper and lower discharge openings 150, 152. For example, each of the upper dampers 156 may be configured to move to a first position, in which the upper dampers 156 are disposed adjacent to the upper discharge openings 150. Accordingly, the upper fans 146 may draw the supply air 102 through the upper discharge openings 150 and the upper chamber 140. Conversely, each of the upper dampers 156 may move to second position, in which the upper dampers 156 may be disposed over the upper discharge openings 150 and, thus, block the supply air 102 from flowing through the upper discharge openings 150. Similar to the above, the lower dampers 158 may be configured to move between a respective first position and a respective second position, which may allow the lower dampers 158 to enable, or disable, the discharge of supply air 102 through the lower openings 152.

Figure 6:
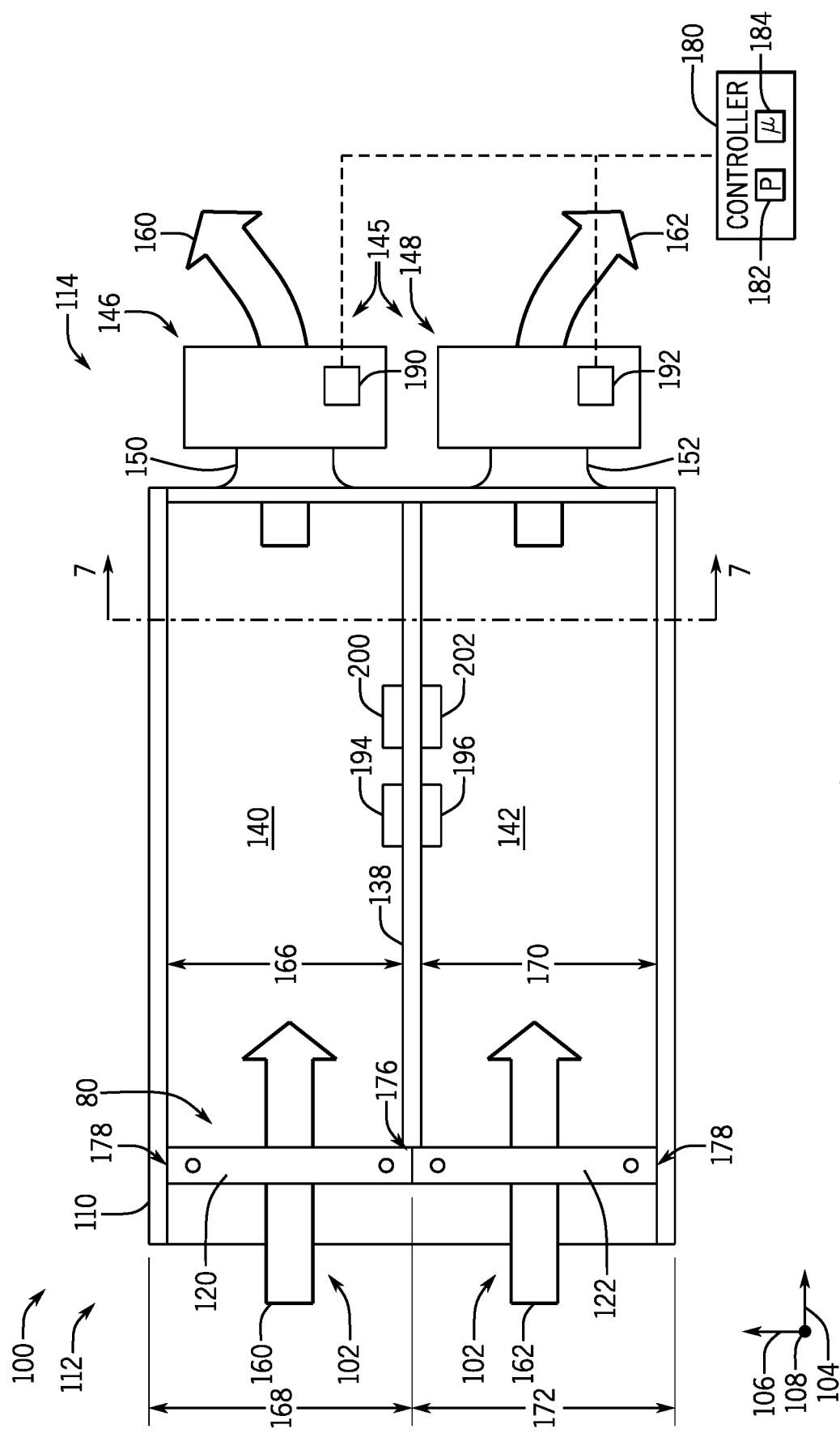
FIG. 6 is a cross-sectional view of an embodiment of the adjustable fan duct of FIG. 5, in accordance with an aspect of the present disclosure.

FIG. 6 is cross-sectional side view of an embodiment of the adjustable fan duct 100. As discussed above, the separation plate 138 may be used to divide the outer housing 110 and define the upper and lower chambers 140, 142, which may facilitate directing the supply air 102 across the upper and lower section 120, 122 of the evaporator 80. Specifically, the upper fans 148 may draw a first airflow 160 of the supply air 102 through the upper chamber 140 and across the upper section 120 of the evaporator 80, while the lower fans 148 may draw a second airflow 162 of the supply air 102 through the lower chamber 142 and across the lower section 122 of the evaporator 80. Accordingly, the refrigerant within the evaporator 80 may absorb thermal energy from the first airflow 160 and the second airflow 162, and thus, cool the first and second airflows 160, 162. In other words, a temperature of the first airflow 160 downstream of the upper section 120, with respect to a flow direction of the first airflow 160 through the adjustable fan duct 100, may be less than a temperature of the first airflow 160 upstream of the upper section 120. Similar to the first airflow 160, a temperature of the second airflow 162 downstream of the lower section 122 may be less than a temperature of the second airflow 162 upstream of the lower section 122.

The separation plate 138 may be positioned such that a height 166 of the upper chamber 140 is substantially equal to a height 168 of the upper section 120 of the evaporator 80, while a height 170 of the lower chamber 142 is substantially equal to a height 172 of the lower section 122 of the evaporator 80. As such, the separation plate 138 may ensure that the upper and lower chambers 140, 142 are properly sized and associated with the upper and lower sections 120, 122 of the evaporator 80, respectively. It should be noted that the height 168 of the upper section 120 and, thus, the height 166 of the upper chamber 140 may be substantially equal to, or different than, the height 172 of the lower section 122 and, thus, the height 170 of the lower chamber 142. A seal 176 may be disposed between the separation plate 138 and the evaporator 80, which may block the first air flow 160 from flowing into the lower chamber 142 and, similarly, block the second air flow 162 from flowing into the upper chamber 140. Accordingly, the separation plate 138 may ensure that substantially all of the first airflow 160 flowing across the upper section 120 of the evaporator 80 enters the upper chamber 140, while substantially all of the second airflow 162 flowing across the lower section 122 of the evaporator 80 enters the lower chamber 142. In some embodiments, an additional seal 178 may be disposed about a circumference or perimeter of the evaporator 80, which may block the supply air 102 from flowing through a space or gap between the evaporator 80 and the outer housing 110.

In some embodiments, the adjustable fan duct 100 may include a controller 180, or a plurality of controllers, which may be used to control certain components of the adjustable fan duct 100. For example, one or more control transfer devices, such as wires, cables, wireless communication devices, and the like, may communicatively couple the upper and lower fans 146, 148, the upper and lower dampers 156, 158, or any other suitable components of the adjustable fan duct 100 to the controller 180. The controller 180 may include a processor 182, such as a microprocessor, which may execute software for controlling the components of the adjustable fan duct 100. Moreover, the processor 182 may include multiple microprocessors, one or more "general-purpose" microprocessors, one or more special-purpose microprocessors, and/or one or more application specific integrated circuits (ASICS), or some combination thereof.

For example, the processor 182 may include one or more reduced instruction set (RISC) processors. The controller 180 may also include a memory device 184 that may store information such as control software, look up tables, configuration data, etc. The memory device 184 may include a volatile memory, such as random access memory (RAM), and/or a nonvolatile memory, such as read-only memory (ROM). The memory device 184 may store a variety of information and may be used for various purposes. For example, the memory device 184 may store processor-executable instructions including firmware or software for the processor 182 execute, such as instructions for controlling the components of the adjustable fan duct 100. In some embodiments, the memory device 184 is a tangible, non-transitory, machine-readable-medium that may store machine-readable instructions for the processor 182 to execute. The memory device 184 may include ROM, flash memory, a hard drive, or any other suitable optical, magnetic, or solid-state storage medium, or a combination thereof. The memory device 184 may store data, instructions, and any other suitable data.

In some embodiments, the controller 180 may be communicatively coupled to one or more control units that may be used to control a speed of the one or more fans 145. For example, an upper control unit 190 may control the upper fans 146, while a lower control unit 192 may control the lower fans 148. In some embodiments, the upper and lower control units 190, 192 may include a variable speed drive (VSD), which may be configured to accelerate the upper fans 146, the lower fans 148, or both, from zero revolutions per minute (RPM) to a threshold speed. In some cases, the upper and lower control units 190, 192 may further regulate a magnitude of the threshold speed during operation of the upper and lower fans 146, 148, respectively. It should be noted that in certain embodiments, each fan of the upper fans 146 and each fan of the lower fans 148 may be controlled by an individual control unit. For example, a first upper control unit may be configured to control a speed of a first upper fan, while a second upper control unit may be configured to control a speed of a second upper fan, and so on. Accordingly, the controller 180 may instruct each of the control units to individually modulate a speed of each fan of the upper fans 146 and each fan of the lower fans 148.

The adjustable fan duct 100 may include an upper pressure sensor 194 and a lower pressure sensor 196, which are disposed within the upper chamber 140 and the lower chamber 142, respectively. The upper pressure sensor 194 may measure an air pressure within the upper chamber 140, while the lower pressure sensor 196 may measure an air pressure within the lower chamber 142. The upper and lower pressure sensors 194, 196 may include Pitot static tubes, pressure transducers, manometers, or any other suitable pressure measuring instrument. The upper and lower pressure sensors 194, 196 may be communicatively coupled to the controller 180, such that the controller 180 may monitor the pressure within each of the upper and lower chambers 140, 142 of the adjustable fan duct 100.

In some embodiments, the controller 180 may use feedback from the upper and lower pressure sensors 194, 196 to regulate a flow rate of supply air 102 across the upper section 120 and the lower section 122 of the evaporator 80. For example, operation of the upper and lower fans 146, 148 may generate a pressure drop or differential across the upper and lower sections 120, 122 of the evaporator 80, such that a pressure within the upper chamber 140 and a pressure within the lower chamber 142 may be less than a pressure of the ambient environment, such as the atmosphere. A target pressure within the upper chamber 140 may correspond with a predetermined flow rate of the first airflow 160, which may be generated by the upper fans 146. Similarly, a target pressure within the lower chamber 142 may correspond with a predetermined flow rate of the second airflow 162, which may be generated by the lower fans 148. The controller 180 may be configured to modulate a speed of the upper and lower fans 146, 148 when a pressure deviation of the target pressure within the upper chamber 140 and/or a pressure deviation of the target pressure within the lower chamber 142 exceeds a threshold value. Accordingly, the controller 180 may substantially maintain a desired flow rate of each of the first airflow 160 and the second airflow 162. For example, if the pressure within the upper chamber 140 rises above the target pressure by a predetermined amount, the controller 180 may instruct the upper control unit 190 to increase a speed of the upper fans 146. Accordingly, a pressure drop across the upper section 120 of the evaporator 80 may increase, while a pressure within the upper chamber 140 may decrease and approach the predetermined target pressure. As such, the controller 180 may substantially maintain the flow rate of the first airflow 160 within the upper chamber 140 and/or a flow rate of the second airflow 162 within the lower chamber 142.

In some embodiments, the adjustable fan duct 100 may include an upper temperature sensor 200 and a lower temperature sensor 202 disposed within the upper chamber 140 and the lower chamber 142, respectively, which are communicatively coupled to the controller 180. The upper and lower temperature sensors 200, 202 may monitor a temperature of the first airflow 160 and a temperature of the second airflow 162, which may be used to modulate a flow rate of the first airflow 160 and a flow rate of the second airflow 162 in addition to, or in lieu of, the feedback acquired from the upper and lower pressure sensors 194, 196. For example, when a temperature of the first airflow 160 is above a target value or when a cooling load demand of the HVAC system is not satisfied, the controller 180 may instruct the upper control unit 190 to increase a speed of the upper fans 146. Conversely, when a temperature of the first airflow 160 is below the target value and a cooling load demand of the HVAC system is satisfied or exceeded, the controller 180 may decrease a speed of the upper fans 146 or, as described in greater detail herein, temporarily disable operation the upper fans 146.

Figure 7:
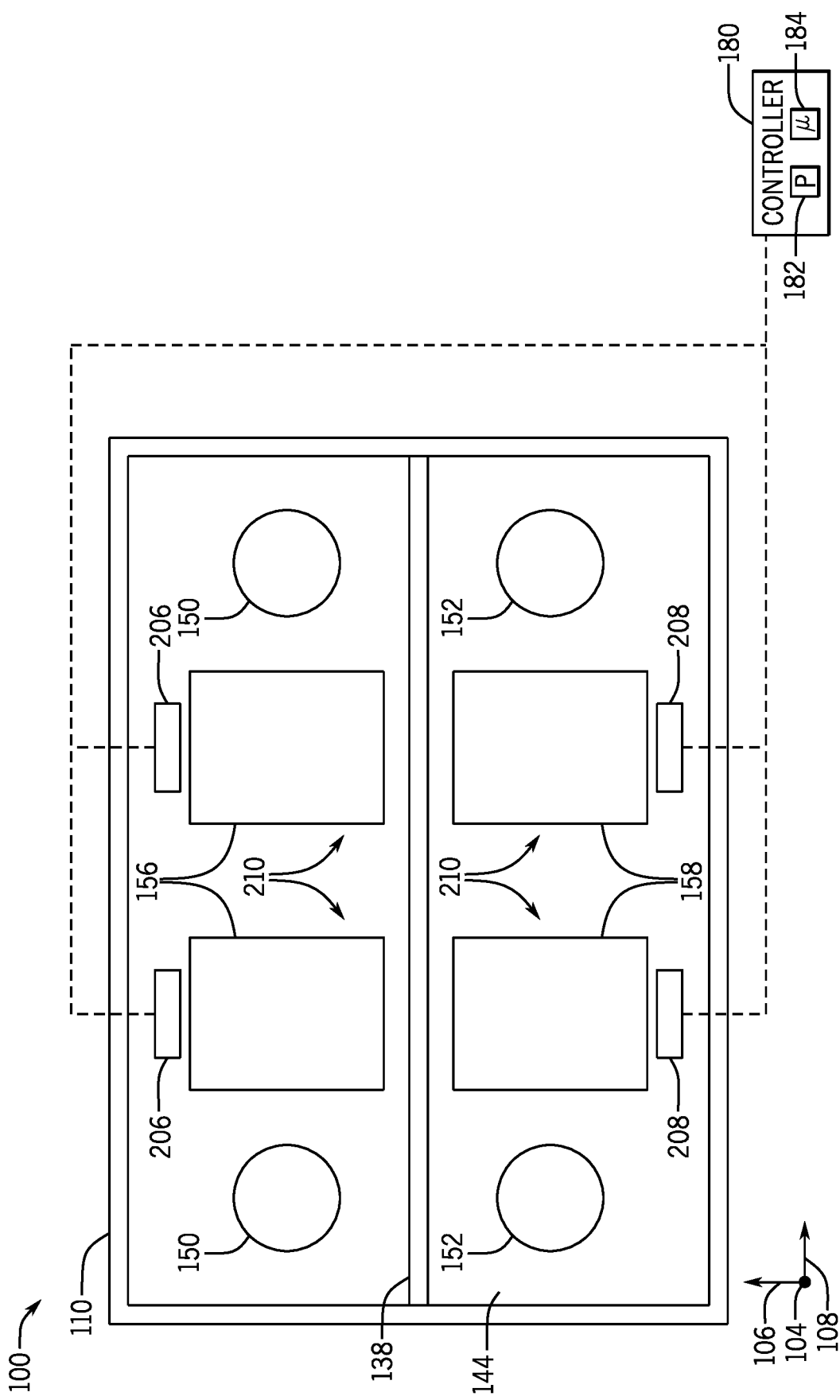
FIG. 7 is a cross-sectional view of the adjustable fan duct of FIG. 6 taken along line 7-7, in accordance with an aspect of the present disclosure.
Figure 9:
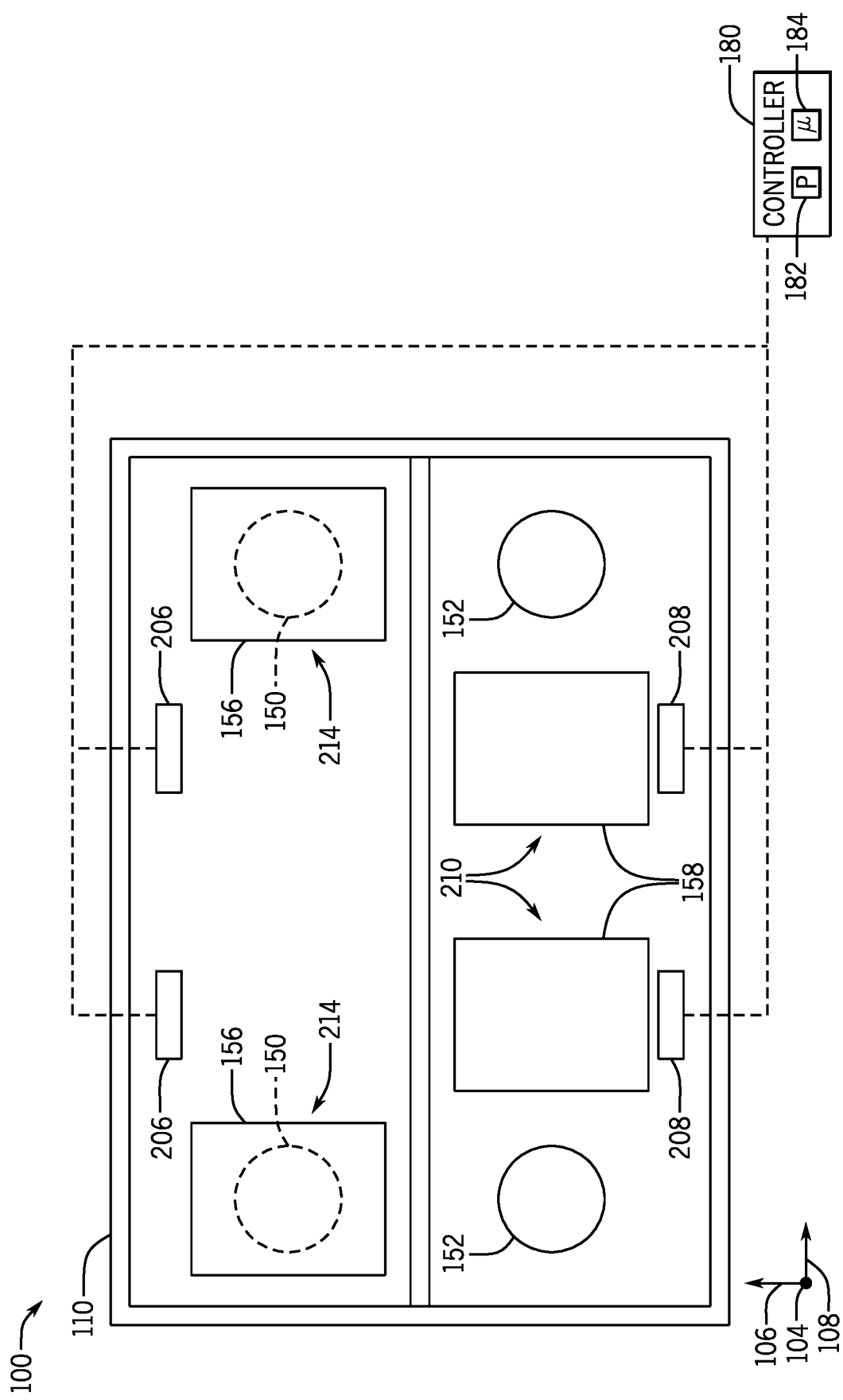
FIG. 9 is a cross-sectional view of the adjustable fan duct of FIG. 8 taken along line 9-9, in accordance with an aspect of the present disclosure.

FIG. 7 is a cross-sectional front view of an embodiment of the adjustable fan duct 100 taken along line 7-7 of FIG. 6. As discussed above, the adjustable fan duct 100 may include upper dampers 156 and lower dampers 158 that are configured to slide along the lateral direction 108, generally parallel to the end plate 144 of the outer housing 110. The upper and lower dampers 156, 158 may be coupled to upper actuators 206 and lower actuators 208, respectively, which may be configured to move the upper dampers 156 and the lower dampers 158 between a respective first position 210 and a respective second position (as shown in FIG. 9). Although two upper actuators 206 and two lower actuators 208 are shown in the illustrative embodiment, it should be noted that a single actuator may be used to move the upper dampers 156 and, similarly, a single actuator may be used to move the lower dampers 158. The upper and lower actuators 206, 208 may be communicatively coupled to the controller 180, such that the controller 180 may instruct the upper and lower actuators 206, 208 to move the upper and lower dampers 156, 158 between the first position 210 and the second position.

In some embodiments, the upper and lower dampers 156, 158 may be disposed adjacent, or between, the upper discharge openings 150 and the lower discharge openings 152, respectively, when the upper and lower dampers 156, 158 are in the first position 210. Accordingly, the one or more fans 145 may draw the supply air 102 across the evaporator 80, through the upper and lower chambers 140, 142, and out the upper and lower discharge openings 150, 152. However, as described in greater detail herein, the upper and lower dampers 156, 158 may block the supply air 102 from flowing through the upper and lower discharges openings 150, 152 when in the second position.

Figure 8:
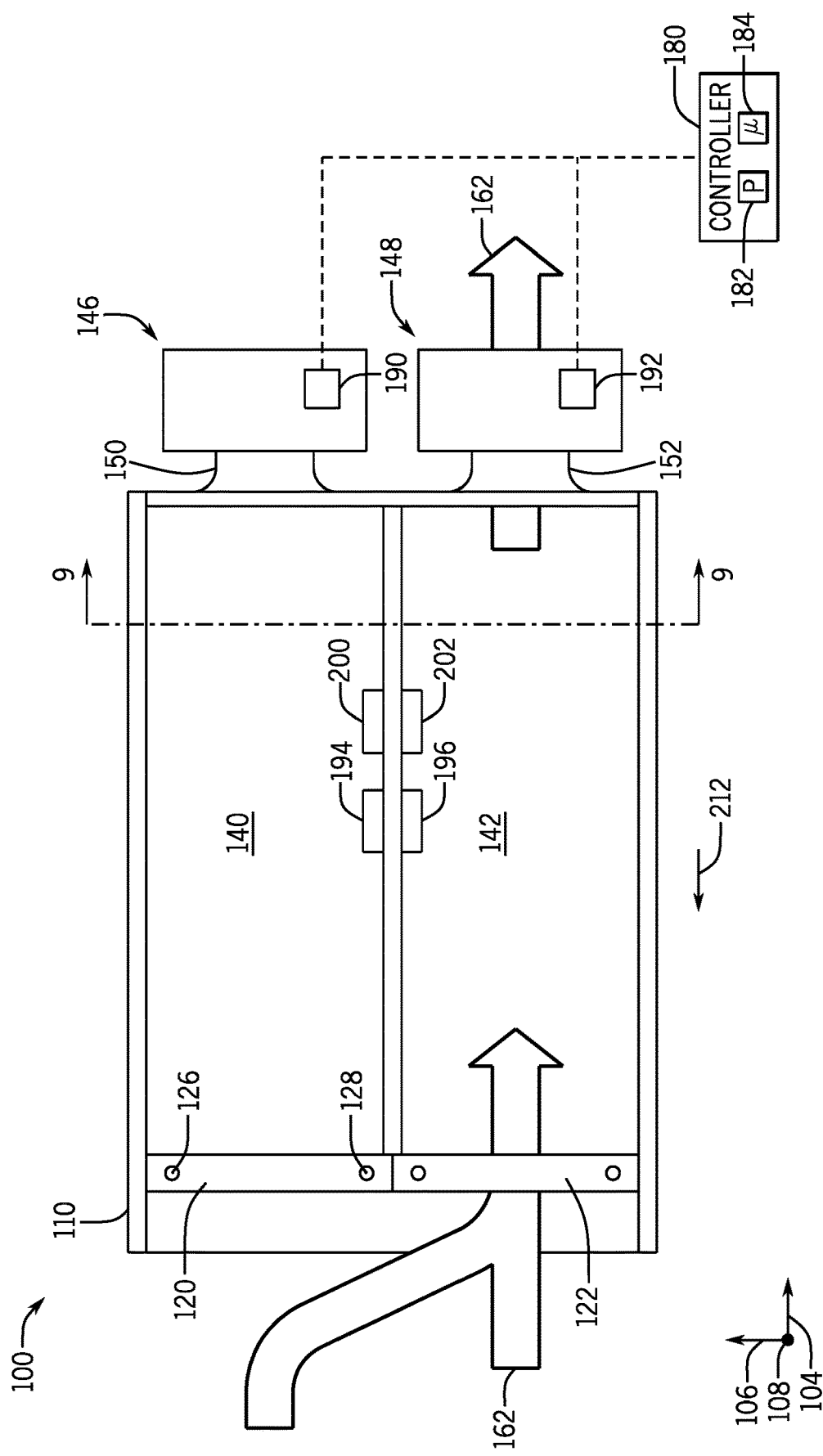
FIG. 8 is a cross-sectional view of an embodiment of the adjustable fan duct of FIG. 5, in accordance with an aspect of the present disclosure.

FIG. 8 is a cross-sectional side view of an embodiment of the adjustable fan duct 100 in which the upper fans 146 are deactivated, such that substantially no supply air 102 is drawn through the upper chamber 140. As discussed above, the controller 180 may be configured to deactivate the upper fans 146, or the lower fans 148, when the upper section 120, or the lower section 122, of the evaporator 80 is inactive or not circulating refrigerant. For example, the controller 180 may monitor a cooling load of the HVAC system and determine that refrigerant flow through the upper section 120 is not desired, and thus air flow across the upper section 120 may be suspended. In other words, the controller 180 may determine that operation of the upper section 120 is not desired to meet the cooling load demand. In such an example, the controller 180 may instruct the upper control unit 190 to decrease a speed of the upper fans 146, or deactivate the upper fans 146. In some embodiments, when a temperature of the first airflow 160 drops below a target value by a predetermined amount, it may be determined that a cooling capacity of the upper section 120 is undesired to satisfy a cooling load or demand of the HVAC system. Additionally or otherwise, the controller 180 may monitor the capacity of the upper section 120 through additional sensors disposed about the vapor compression system 72, such as temperature sensors which measure a temperature of the refrigerant flowing into and/or out of the upper section 120 through the upper inlet 126 and the upper outlet 128. For example, when a temperature of the refrigerant leaving the upper section 120 though the upper outlet 128 falls below a target value by a predetermined amount, the controller 180 may instruct the upper control unit 190 to disable, or decrease a speed of, the upper fans 146 if the cooling capacity of the upper section 120 is not desired. Similar to the above discussion, the controller 180 may monitor a cooling capacity of the lower section 122 of the evaporator 80 and, thus, deactivate, or decrease a speed of, the lower fans 148 when the cooling capacity of the lower section 122 is undesired to satisfy a cooling load or demand of the HVAC system.

In some embodiments, vapor compression system 72 may modulate a flow of refrigerant through each of the upper section 120 and the lower section 122 of the evaporator 80 in response to certain operational conditions of the vapor compression system 72. For example, the vapor compression system 72 may decrease a flowrate, or a capacity, of refrigerant within the upper section 120 and/or the lower section 122 by 10 percent, 50 percent, 75 percent, or more, in response to variations in system capacity of the vapor compression system 72, such as a cooling load or demand of the HVAC system. In such embodiments, the controller 180 may monitor a flow rate of refrigerant flowing into the upper section 120 and the lower section 122, and adjust a speed of the upper fans 146, and/or the lower fans 148, respectively, such as when the flow rate falls rises or below a target value by a predetermined amount. The controller 180 may monitor the flow rate using a flow meter, a rotameter, and any other suitable measuring device.

The upper dampers 156 may move to a second position (as shown in FIG. 9) when the upper fans 146 are deactivated, which may reduce or prevent a backdraft of air from flowing through the upper discharge ports 150 and the upper chamber 140 in an upstream direction 212. For example, the second airflow 162 drawn by the lower fans 148 may generate a low pressure region near the upstream end portion 112 of the adjustable fan duct 100. Accordingly, supply or ambient air near the upper section 120 of the evaporator 80 may be drawn through the lower section 122 of the evaporator 80, which, in some embodiments, may draw air from within the upper chamber 140 through upper section 120 of the evaporator 80 in the upstream direction 212. Moving the upper dampers 156 to the second position may block substantially all air from flowing into the upper chamber 140 through the deactivated upper fans 146 and the upper discharge ports 150 and, thus, mitigate an amount of backdraft air that may flow through upper section 120 of the evaporator 80 in the upstream direction 212. By reducing backdraft flowing through a section of the adjustable fan duct 102 with a section of the evaporator 80 that is not operating, the overall efficiency of the HVAC system at part load may be improved.

For example, FIG. 9 is a cross-sectional front view of an embodiment of the adjustable fan duct 100 taken along line 9-9 in FIG. 8, which illustrates the upper dampers 156 in a second position 214. As discussed above, the upper dampers 156 may be disposed over the upper discharge openings 150 when in the second position 214, such that substantially no air may flow through the upper discharge openings 150. The upper actuators 206 may move the upper dampers 156 along the lateral direction 108 from the first position 210 to the second position 212 and maintain the upper dampers 156 in the second position 214, while the upper fans 146 and the upper section 120 of the evaporator 80 are not operating. Similar to the upper dampers 156, the lower actuators 208 may move the lower dampers 158 to the second position 214 while the lower fans 148 and the lower section 122 of the evaporator 80 are not operating, such as if the lower fans 148 are disabled instead of the upper fans 146. In other embodiments, the upper and lower actuators 206, 208 may move both the upper dampers 156 and the lower dampers 158 to the second position 214 when both the upper fans 146 and the lower fans 148 are inactive.

While the above embodiments of the adjustable fan duct 100 have been described as having the separation plate 138 dividing the outer housing 110 into the upper chamber 140 and the lower chamber 142, it should be noted that in certain embodiments, the adjustable fan duct 100 may also include one or more vertical separation plates that are oriented substantially perpendicular to the separation plate 138, and divide the upper and lower chambers 140, 142 into a pair of upper chambers and a pair of lower chambers, respectively. For example, with reference to FIG. 5, the vertical separation plates may extend along the longitudinal direction 104 from the upstream end portion 112 to the downstream end portion 114 of the adjustable fan duct 100. A first vertical separation plate may be disposed within the upper chamber 140 and extend between the outer housing 110 and the separation plate 138, while a second vertical separation plate may be disposed within the lower chamber 142 and extend between the separation plate 138 and the outer housing 110. Accordingly, the first and second vertical separation plates may divide the upper chamber 140 and the lower chamber 142 into the pair of upper chambers and the pair of lower chambers.

In some embodiments, each chamber of the pair of upper chambers is in fluid communication with a respective opening of the upper discharge openings 150. This configuration may enable a respective one of the upper dampers 156 and/or a respective one of the upper fans 146 to modulate a flowrate of the supply air 102 through each chamber of the pair of upper chambers, in accordance with the operational methods discussed above. Similarly, the second vertical separation plate may enable a respective one of the lower dampers 158 and/or a respective one of the lower fans 148 to modulate a flowrate of the supply air 102 through each chamber of the pair of lower chambers.

In certain embodiments, each chamber of the pair of upper chambers and/or each chamber of the pair of lower chambers may be associated with a separate section, or a separate coil, of the evaporator 80. For example, the upper section 120 of the evaporator 80 may include a pair of subsections or pair of coils, which are each associated with a respective chamber of the pair of upper chambers. However, in other embodiments, the upper section 120 of the evaporator 80 may be a single coil, and the pair of upper chambers may subdivide a flow path extending across the upper section 120. The pair of lower chambers may be similarly used to subdivide one or more portions of the lower section 122 of the evaporator 80.

Figure 10:
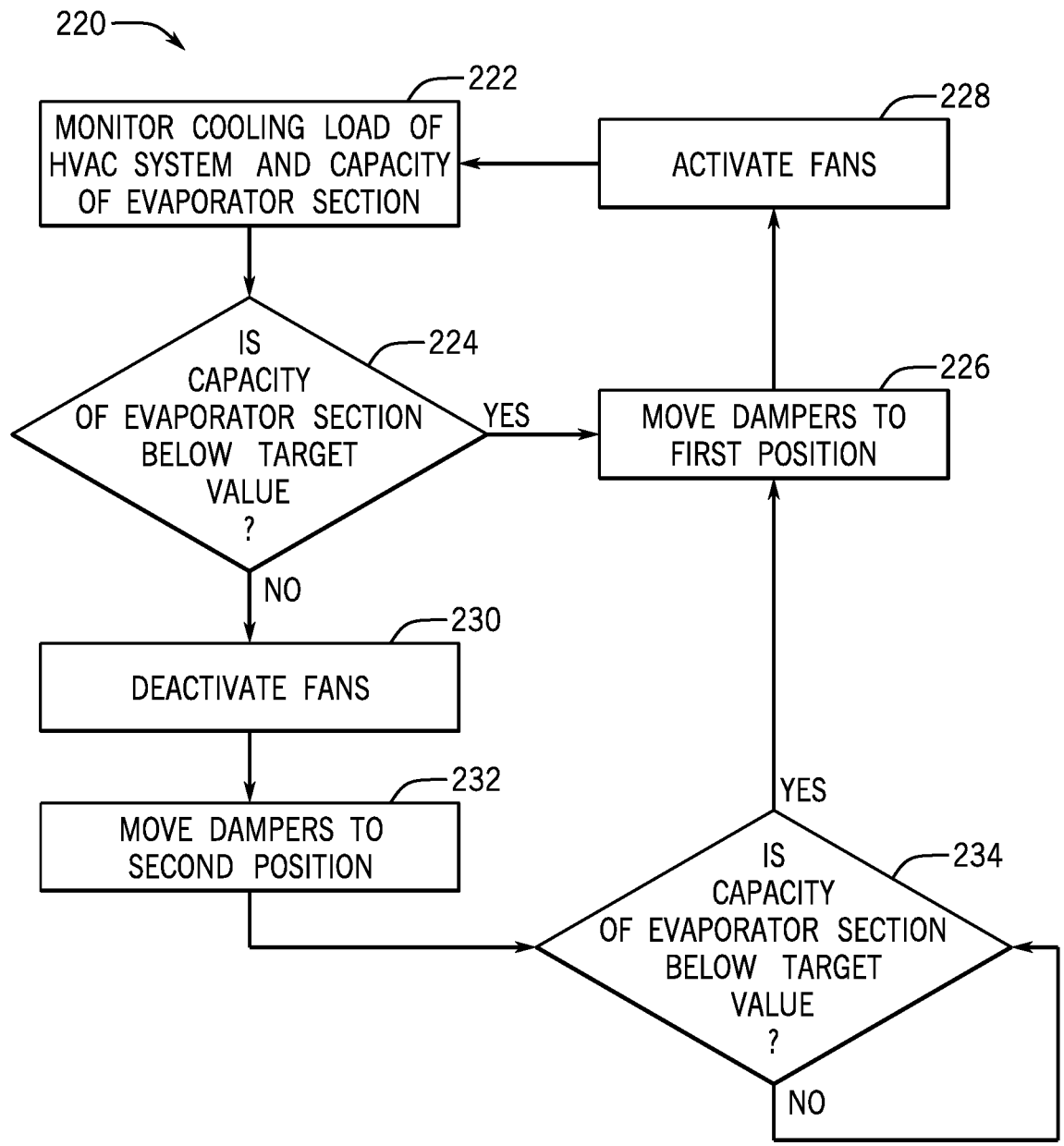
FIG. 10 is a block diagram of an embodiment of a method of operating the adjustable fan duct of FIG. 5, in accordance with an aspect of the present disclosure.

FIG. 10 is a block diagram of an embodiment of a method 220 of operating the adjustable fan duct 100. The controller 180 may monitor a cooling load or demand of the HVAC system and may monitor a capacity of each section of the evaporator 80, such as a capacity of the upper section 120 and a capacity of the lower section 122, as indicated by process block 222. For example, the controller 180 may monitor a temperature or a flow rate of refrigerant flowing into, or out of, each section of the evaporator 80. In some embodiments, the controller 180 may monitor a flow rate of the first airflow 160 or a flow rate of the second airflow 162 within the upper chamber 140 or the lower chamber 142, respectively, using the upper and lower pressure sensors 194, 196. In other embodiments, the controller 180 may monitor the temperature of the first airflow 160 or the temperature of the second airflow 162 using the upper and lower temperatures sensors 200, 202, respectively. In still further embodiments, the controller 180 may monitor any other suitable parameters of the adjustable fan duct 100 to determine the capacity of each section of the evaporator 80, as well as the capacity of the entire evaporator 80. Accordingly, the controller 180 may determine, as indicated by decision block 224, whether a capacity of each section of the evaporator 80, or the entire evaporator 80, is below or above a target value, such as a cooling load or demand of the HVAC system. For clarity, a capacity of each section of the evaporator 80, or a capacity of the entire evaporator 80, is at the target capacity when the evaporator sections and/or the entire evaporator 80, respectively, substantially satisfy the cooling load or cooling demand of the HVAC system. The capacity of the evaporator sections or the capacity of the entire evaporator 80 is below the target capacity when the evaporator sections or the evaporator 80, respectively, are unable to satisfy the cooling load or cooling demand of the HVAC system. The evaporator sections or the evaporator 80 are above the target capacity when the evaporator sections or the evaporator 80, respectively, provide a cooling capacity that exceeds the cooling load or cooling demand of the HVAC system.

As a non-limiting example, if the upper section 120 of the evaporator 80 is operational and the lower section 122 of the evaporator 80 is non-operational, the upper dampers 156 are disposed in the first position 210 with the upper fans 146 operational, while the lower dampers 158 are disposed in the second position 214 with the lower fans 148 non-operational. If a measured capacity of the upper section 120 of the evaporator 80 is below the target value, such as a cooling load or demand of the HVAC system, the controller 180 may move the lower dampers 158 to the first position 210, as indicated by process block 226, and instruct the lower control unit 192 to activate the lower fans 148, as indicated by process block 228. The controller 180 may additionally initiate refrigerant flow through the lower section 122 of the evaporator 80. Accordingly, the lower section 122 of the evaporator 80 may begin operation in conjunction with operation of the upper section 120 of the evaporator 80, which may increase an overall capacity of the entire evaporator 80. The upper fans 146 may continue to direct the first airflow 160 through the upper section 120 of the evaporator 80 and the upper chamber 140 of the adjustable fan duct 100. In this way, the upper section 120 of the evaporator 80 may continue to supply conditioned supply air 102 to the cooling load. Similarly, the lower fans 148 may additionally direct the second airflow 162 through the lower section 122 of the evaporator 80 and the lower chamber 142 of the adjustable fan duct 100, and thus, enable the lower section 122 of the evaporator 80 to supply additional conditioned supply air 102 to the cooling load.

If a capacity of the upper section 120, or a capacity of the lower section 122, or a capacity of the entire evaporator 80, is above the target value, the controller 180 may instruct the upper control unit 190 and/or the lower control unit 192, to deactivate the upper fans 146 and/or the lower fans 148, respectively, as indicated by process block 230. In addition, the controller 180 may instruct the upper actuators 206, or the lower actuators 208, to move the upper dampers 156, or the lower damper 158, respectively, to the second position 214. Accordingly, the controller 180 may reduce or prevent a backdraft of air flowing through the upper chamber 140 and/or the lower chamber 142 while the upper fans 146 and/or the lower fans 148 may be disabled. In this way, part load operation of the evaporator 80 may be improved. Specifically, an efficiency of the evaporator 80 may be improved during part load operation.

The controller 180 may continue to monitor the capacity of each section of the evaporator 80, as well as a cooling load demand of the HVAC system, as indicated by decision block 234. If the capacity of the upper section 120 and/or the lower section 122 of the evaporator 80 remains above the target value, the controller 180 may maintain the upper dampers 156 and/or the lower dampers 158 in the second position 214. Additionally, the controller 180 may instruct the upper fans 146 and/or the lower fans 148 to remain in a deactivated state. If the capacity of the upper section 120 or the lower section 122 falls below the target value, such as the cooling demand, the controller 180 may move the upper dampers 156 or the lower dampers 158, respectively, to the first position 210, as indicated by process block 226. The controller 180 may further instruct the upper fans 146 and/or the lower fans 148 to activate, as indicated by process block 228. In this manner, the evaporator 80 may provide additional cooling to the cooling load.

It should be noted that the adjustable fan duct 100 is not limited to two chambers, such as the upper chamber 140 and the lower chamber 142, but may have any suitable number of chambers, such as 1, 2, 3, 4, 5, 6, or more chambers, which each correspond to a certain section of the evaporator 80. Accordingly, the method 220 may be used to operate one or more dampers and one or more fans associated with each section of the evaporator 80. In other words, the method 220 may be used to operate an adjustable fan duct 100 that includes 1, 2, 3, 4, 5, 6, or more sets of dampers and fans, which correspond to 1, 2, 3, 4, 5, 6, or more sections of the evaporator 80.

As discussed above, the aforementioned embodiments of the adjustable fan duct 100 may be used on the HVAC unit 12, the residential heating and cooling system 50, or in any other suitable HVAC system. Additionally, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An adjustable fluid flow system for a temperature control system, comprising:
   a heat exchanger comprising two or more channel sections, wherein each of the two or more channel sections comprises a plurality of channels configured to transmit a working fluid, and wherein the heat exchanger is configured to independently direct the working fluid through a selection of the two or more channel sections;
   a first chamber defining a first flow path extending across and aligned with a first channel section of the two or more channel sections, wherein the first chamber comprises a first outlet in fluid communication with the first flow path;
   a second chamber defining a second flow path extending across and aligned with a second channel section of the two or more channel sections, wherein the second chamber comprises a second outlet in fluid communication with the second flow path;
a divider extending from the heat exchanger and between the first chamber and the second chamber to fluidly isolate the first flow path and the second flow path;
a damper configured to adjust a flow of air along the first flow path;
a valve configured to adjust flow of the working fluid through the first channel section; and
a controller communicatively coupled to the damper and the valve, wherein, in response to a determination to transition the first channel section to a non-operational state, the controller is configured to actuate the damper to block the first outlet to obstruct the flow of air along the first flow path and across the first channel section, and to actuate the valve to fully block the flow of the working fluid through the first channel section and enable the flow of the working fluid through the second channel section.

2. The adjustable fluid flow system of claim 1, further comprising:
a first fan in fluid communication with the first outlet of the first chamber and configured to direct the flow of air along the first flow path; and
a second fan in fluid communication with the second outlet of the second chamber and configured to direct an additional flow of air along the second flow path, wherein the controller is configured to adjust respective operational speeds of the first fan and the second fan based on feedback indicative of a first capacity of the first channel section, a second capacity of the second channel section, or both.

3. The adjustable fluid flow system of claim 2, wherein the controller is configured to deactivate the first fan upon a determination that the first capacity of the first channel section exceeds a target value.

4. The adjustable fluid flow system of claim 3, wherein the controller is configured to actuate the damper to block the first outlet upon a determination that the first capacity of the first channel section exceeds the target value.

5. The adjustable fluid flow system of claim 1, comprising:
a fan fluidly coupled to the first flow path and configured to direct the flow of air along the first flow path; and
a sensor configured to provide feedback indicative of a pressure within the first chamber wherein the controller is communicatively coupled to the sensor and configured to adjust the fan based on the feedback.

6. The adjustable fluid flow system of claim 1, wherein the working fluid is refrigerant, and wherein each channel section of the two or more channel sections comprises:
an inlet configured to receive a flow of the refrigerant;
a coil fluidly coupled to the inlet; and
an outlet fluidly coupled to the coil, wherein the outlet is configured to discharge the flow of the refrigerant, and wherein a first refrigerant flow path extending from the inlet of the first channel section to the outlet of the first channel section is independent of a second refrigerant flow path extending from the inlet of the second channel section to the outlet of the second channel section.

7. The adjustable fluid flow system of claim 1, wherein the divider extends from an interface of the heat exchanger between the first channel section and the second channel section.

8. The adjustable fluid flow system of claim 7, wherein the first outlet, the second outlet, or both, are formed in an end plate of the adjustable fluid flow system, wherein the divider extends to the end plate.

9. The adjustable fluid flow system of claim 1, comprising:
a fan fluidly coupled to the first flow path; and
a sensor configured to generate feedback indicative of a parameter of the flow of air along the first flow path, wherein the controller is communicatively coupled to the fan and the sensor, wherein the controller is configured to adjust operation of the fan based on the feedback.

10. The adjustable fluid flow system of claim 9, wherein the parameter comprises a temperature of the air flow.

11. The adjustable fluid flow system of claim 9, wherein the parameter comprises a pressure of the flow of air, wherein the controller is configured to adjust the operation of the fan in response to a determination that the pressure of the flow of air deviates from a target value by a threshold amount.

12. The adjustable fluid flow system of claim 1, comprising:
a fan fluidly coupled to the first flow path and configured to direct the flow of air along the first flow path, wherein the controller is communicatively coupled to the fan, wherein the controller is configured to monitor a capacity of the first channel section and adjust operation of the fan based on the capacity.

13. The adjustable fluid flow system of claim 12, wherein the controller is configured to determine the capacity of the first channel section based on a flow rate of refrigerant supplied to and entering the first channel section.

14. The adjustable fluid flow system of claim 12, wherein the controller is configured to deactivate the fan and transition the damper to a closed position to block the first outlet based on a determination that the capacity exceeds a target value.

15. A temperature control system, comprising:
a heat exchanger, wherein the heat exchanger is divided into two or more sections;
two or more chambers positioned adjacent to the two or more sections, wherein a first chamber of the two or more chambers comprises a first outlet, and a first damper associated with the first outlet, and a second chamber of the two or more chambers comprises a second outlet and a second damper associated with the second outlet;
a divider extending from the heat exchanger and between the first chamber and the second chamber to fluidly isolate a first flow path through the first chamber from a second flow path through the second chamber, wherein the first flow path extends across a first section of the two or more sections and through the first outlet, and the second flow path extends across a second section of the two or more sections and through the second outlet;
a valve configured to adjust a flow of working fluid through the first section; and
a controller communicatively coupled to the first damper and the valve, wherein the controller is configured to actuate the first damper to obstruct air flow along the first flow path and across the first section and to actuate the valve to fully block the flow of working fluid through the first section to transition the first section to a non-operational state.

16. The temperature control system of claim 15, comprising a sensor configured to acquire feedback indicative of an operational parameter of the temperature control system, wherein the controller is configured to modulate a respective position of the first damper or the second damper based on the feedback acquired by the sensor.

17. The temperature control system of claim 15, comprising a fan fluidly coupled to the first flow path and configured to direct the air flow along the first flow path, wherein the controller is configured to adjust operation of the fan based on whether the first section is in an operational state or the non-operational state.

18. The temperature control system of claim 15, comprising a fan fluidly coupled to the first flow path and configured to direct the air flow along the first flow path, wherein the controller is configured to:
monitor an air pressure within the first chamber using a pressure sensor; and
increase or decrease a speed of the fan in response to receiving feedback from the pressure sensor indicative of the air pressure crossing a threshold value.

19. The temperature control system of claim 15, comprising a fan fluidly coupled to the first flow path and configured to direct the air flow along the first flow path, wherein the controller is configured to:
monitor an air temperature within the first chamber using a temperature sensor; and
increase or decrease a speed of the fan in response to receiving feedback from the temperature sensor indicative of the air temperature crossing a threshold value.

20. The temperature control system of claim 15, comprising a fan fluidly coupled to the first flow path and configured to direct the air flow along the first flow path, wherein the controller is configured to:
monitor a capacity of the first section using one or more sensor measurements; and
adjust a speed of the fan and move the first damper to a first position to unblock the first outlet upon a determination that the capacity falls below a target value by a predetermined amount.

21. The temperature control system of claim 20, wherein the controller is configured to deactivate the fan and move the first damper to a second position to block the first outlet upon a determination that the capacity exceeds the target value by the predetermined amount.

22. A fluid flow and temperature control system, comprising:
a vapor compression system;
an evaporator in fluid communication with the vapor compression system, wherein the evaporator includes a first section and a second section and is configured to independently circulate a working fluid through the first section, the second section, or both, wherein the evaporator is disposed adjacent to or within an adjustable fan duct, and wherein the adjustable fan duct comprises:
a first chamber associated with the first section of the evaporator relative to a first airflow path, wherein the first chamber comprises a first outlet, a first damper associated with the first outlet, and a first fan;
a second chamber associated with the second section of the evaporator relative to a second airflow path, wherein the second chamber comprises a second outlet, a second damper associated with the second outlet, and a second fan; and
a divider extending from the evaporator and between the first chamber and the second chamber to fluidly isolate the first airflow path extending across the first section and the second airflow path extending across the second section;
a controller configured to transition the first damper to a closed position to obstruct air flow along the first airflow path and across the first section in response to a determination that the first section is in a non-operational state; and
a valve configured to regulate flow of the working fluid through the first section, wherein the valve is configured to fully block flow of the working fluid through the first section and enable flow of the working fluid through the second section while the first section is in the non-operational state and the second section is in an operational state.

23. The fluid flow and temperature control system of claim 22, wherein the first section and the second section comprise a first refrigerant loop and a second refrigerant loop, respectively.

24. The fluid flow and temperature control system of claim 22, wherein the controller is communicatively coupled to the first fan and the second fan, and wherein the controller is configured to modulate a first speed of the first fan and modulate a second speed of the second fan.

* * * * *